(12) United States Patent
Kudo

(10) Patent No.: US 6,954,878 B2
(45) Date of Patent: Oct. 11, 2005

(54) BREAK BOARD DEBUGGING DEVICE

(75) Inventor: Makoto Kudo, Fujimi-machi (JP)

(73) Assignee: Seiko Epson Corporation (JP)

(*) Notice: Subject to any disclaimer, the term of this patent is extended or adjusted under 35 U.S.C. 154(b) by 600 days.

(21) Appl. No.: 10/027,918

(22) Filed: Dec. 19, 2001

(65) Prior Publication Data
US 2002/0091494 A1 Jul. 11, 2002

(30) Foreign Application Priority Data
Dec. 28, 2000 (JP) ........................................ 2000-403225

(51) Int. Cl.$^7$ .............................................. G06F 11/00
(52) U.S. Cl. ...................................... 714/30; 717/129
(58) Field of Search .............................. 714/30, 34, 35; 717/129

(56) References Cited

U.S. PATENT DOCUMENTS

| | | | | |
|---|---|---|---|---|
| 5,289,587 A | * | 2/1994 | Razban | 703/28 |
| 5,530,804 A | * | 6/1996 | Edgington et al. | 714/30 |
| 5,581,698 A | * | 12/1996 | Miwa et al. | 714/42 |
| 5,943,498 A | * | 8/1999 | Yano et al. | 717/128 |
| 6,094,729 A | * | 7/2000 | Mann | 714/25 |
| 6,134,652 A | * | 10/2000 | Warren | 712/227 |
| 6,145,123 A | * | 11/2000 | Torrey et al. | 717/128 |
| 6,292,910 B1 | * | 9/2001 | Cummins | 714/43 |
| 6,331,957 B1 | * | 12/2001 | Kurts et al. | 365/201 |
| 6,543,048 B1 | * | 4/2003 | Kuzemchak et al. | 717/127 |
| 6,665,821 B1 | * | 12/2003 | Miyayama et al. | 714/45 |
| 6,687,857 B1 | * | 2/2004 | Iwata et al. | 714/38 |
| 6,751,751 B1 | * | 6/2004 | Murray et al. | 714/34 |
| 6,757,846 B1 | * | 6/2004 | Murray et al. | 714/34 |
| 6,779,145 B1 | * | 8/2004 | Edwards et al. | 714/733 |
| 6,792,563 B1 | * | 9/2004 | DesRosier et al. | 714/43 |
| 2002/0147939 A1 | * | 10/2002 | Wenzel et al. | 714/30 |
| 2003/0056154 A1 | * | 3/2003 | Edwards et al. | 714/45 |
| 2003/0196144 A1 | * | 10/2003 | Swoboda et al. | 714/34 |
| 2004/0111707 A1 | * | 6/2004 | Bliss et al. | 717/129 |

FOREIGN PATENT DOCUMENTS

| | | |
|---|---|---|
| JP | 02-186448 | 7/1990 |
| JP | 04-077833 | 3/1992 |
| JP | 08-161191 | 6/1996 |
| JP | 08-179958 | 7/1996 |
| JP | 10-214201 | 8/1998 |

OTHER PUBLICATIONS

"Nikkei Electronics", Mar. 22, 1999, pp. 215–225 (with translation).

* cited by examiner

Primary Examiner—Robert Beausoliel
Assistant Examiner—Christopher McCarthy
(74) Attorney, Agent, or Firm—Harness, Dickey & Pierce, P.L.C.

(57) ABSTRACT

A microcomputer 11 with a debug circuit 11b implemented therein for realizing an on-chip debugging function is mounted on a target board 10 in which a variety of buses 15 are led out and connected to a break board 30. The break board 30 is provided with a break condition storage section 31 and a break signal generation section 32. Break conditions are written in the break condition storage section 31 from the side of a debugger 20 through the debug circuit 11b, the CPU 11a and the various buses 15. Then, a user program stored in a ROM 12 is executed. The break signal generation section 32 monitors signals on the various buses 15, and outputs a break generation signal 30a when the signals on the various buses 15 coincide with the break condition. The execution of the user program is interrupted (stopped) based on the break generation signal 30a.

2 Claims, 4 Drawing Sheets

BREAK BOARD DEBUGGING DEVICE

BACKGROUND OF THE INVENTION

1. Technical Field of the Invention

The present invention relates to a debug device using an on-chip debugging function, and more particularly to a debug device that can expand the break function using an external circuit.

2. Conventional Art

Japanese laid-open patent application HEI 2-186448 (Japanese patent HEI 5-50016) describes an integrated circuit equipped with a debugging environment that enables software debugging by storing a primitive debugger program that enables debugging of the user program of a microcomputer ASIC while communicating with an external host computer in a ROM provided on the microcomputer ASIC chip.

Japanese laid-open patent application HEI 4-77833 (Japanese patent KEI 7-27472) describes an integrated circuit equipped with a debugging environment that enables debugging of programs stored in a user ROM and RAM externally, by performing the communication through a host computer via a serial communication block between a control CPU and the control ROM and RAM.

Japanese laid-open patent application HEI 8-161191 describes an in-circuit emulator that can perform debugging even when a high-speed MPU is a target.

Japanese laid-open patent application HEI 8-179958 describes a microcomputer (controlling electronic device) that is capable of performing debugging without using an ICE by executing a program for debugging assembled in the microcomputer according to a command from a host computer.

Japanese laid-open patent application HEI 10-214201 describes a microcomputer in which a debug circuit equipped with various functions used at the time of program debugging is provided in the microcomputer, and a flash memory electrically capable of writing/erasing incorporated on the same chip can be used as an emulation memory.

A magazine *Nikkei Electronics*, Mar. 22, 1999 edition, at P215–P225, describes the following in its article entitled "On-Chip Debugging Starts Penetrating In Assembly Software Development". Methods in developing software for embedded equipment internally equipped with microprocessors are changing. There are an increasing number of cases to employ an "on-chip debugging" method in which a microprocessor having a debugging exclusive command added in a command set and an exclusive debugger are combined for debugging software.

In the on-chip debugging, the break function is realized by using a break circuit or the like that is mounted on the chip. To realize the break function, a register to store break conditions, addresses for the CPU to access the break conditions set at the register, a comparator circuit to compare data and the like are needed. By providing a plurality of break circuit sets, a plurality of break points can be set. However, when a plurality of break circuit sets are provided, a circuit size (the number of gates) of the debug circuit section increases. There are instances that are not economically preferable to increase the circuit size more than required when realizing microcomputers or ASIC microcomputers. Accordingly, the break function (the number of break points that can be set) that can be used in the on-chip debugging is generally limited to several (2–8) points. In an actual debugging work, a map break function for detecting that the execution of a program extends to outside of an expected address range, data break functions under complex conditions and the like may be needed. In this respect, there has been a demand to expand a break function in a debugging device that uses an on-chip debugging function.

The present invention has been made to solve the problems described above. It is an object of the present invention to provide a debug device using an on-chip debugging function, in which the debug device uses an external circuit to expand a break function.

SUMMARY OF THE INVENTION

A debug device, in accordance with the present invention to solve the problems described above, is formed from a target board having a microcomputer equipped with an on-chip debugging function, a debugger that is connected via a debug interface terminal provided on the target board and that performs debugging using the on-chip debugging function implemented in the microcomputer, and a break board that monitors signals on an address bus, a data bus and a control bus which are led out from the target board, and outputs a break signal when a predetermined break condition is met.

It is noted that the break board may be equipped with a storage section to store break conditions, and break conditions may preferably be written in the storage section via the target board from the debugger.

In the debug device in accordance with the present invention, the break board is connected to the target board, and a break signal is output by the break board, with the result that the break function can be expanded. For example, even when an on-chip debugging function implemented in a microcomputer allows setting only several break points, many more break points can be set by using a break board. Accordingly, this realizes a variety of break functions, such as, for example, a map break in which the operation of a user program is interrupted by detecting that a specified address range is accessed, a bus break in which the operation of a user program is interrupted when specified data is written in or read from a specified address, a sequential break in which the operation of a user program is interrupted when a plurality of bus break conditions are generated in a specified sequence, and the like.

DETAILED DESCRIPTION OF THE PREFERRED EMBODIMENTS OF THE PRESENT INVENTION

Embodiments of the present invention are described below with reference to the accompanying drawings.

Figure 1:
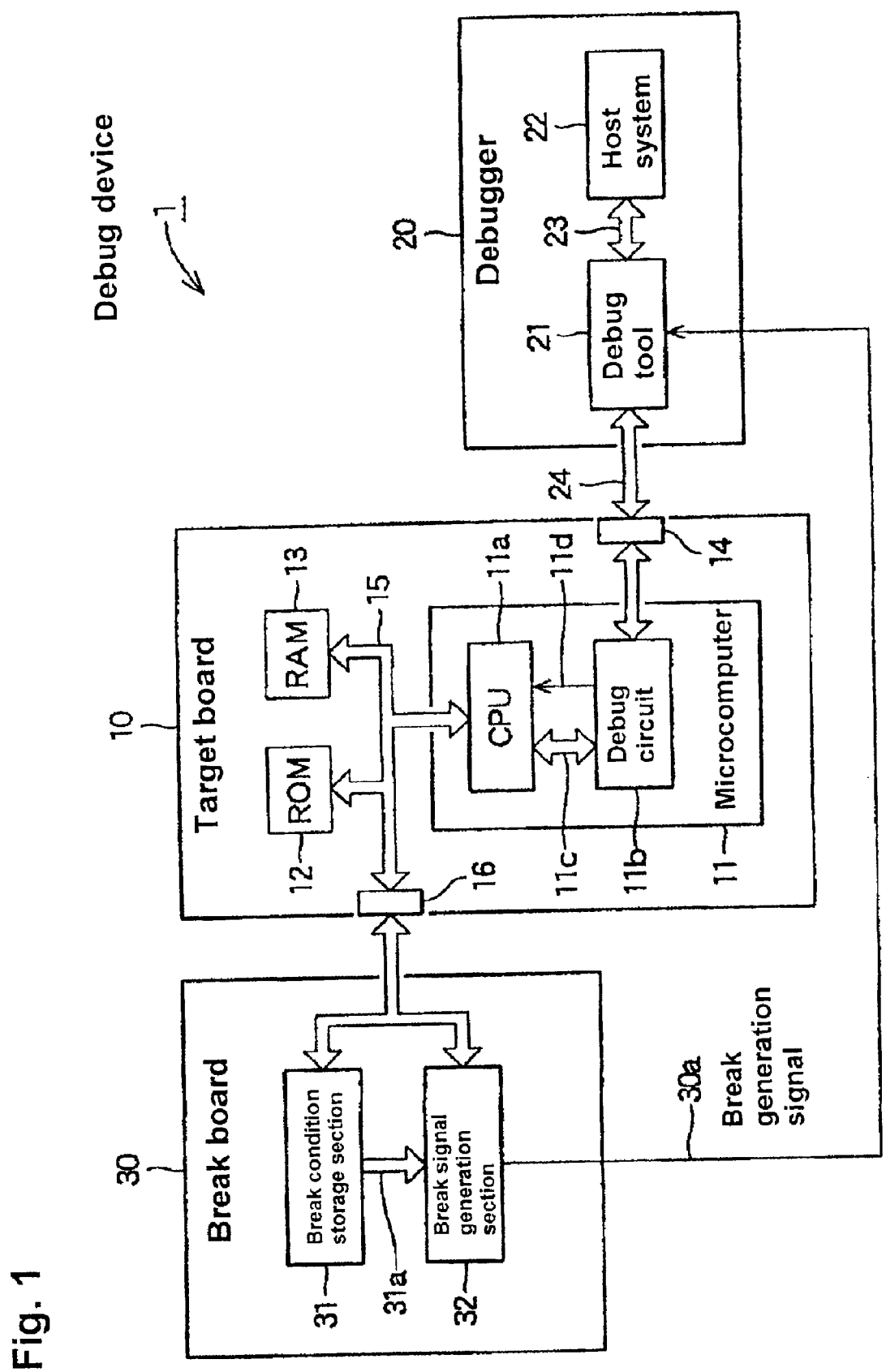
FIG. 1 shows a block diagram of an overall structure of a debug device in accordance with the present invention.

FIG. 1 shows a block diagram of a general structure of a debugging device in accordance with the present invention. The debugging device 1 of the present invention is formed from a target board 10, a debugger 20 and a break board 30.

The target board 10 is provided with a microcomputer 11 equipped with an on-chip debugging function, a ROM 12, a RAM 13, and a variety of functional circuit sections (not shown). The target board 10 is provided with a group of debugging interface terminals 14 and a group of bus interface terminals 16 for externally leading out a variety of buses (address bus, data bus and control bus) 15.

The microcomputer 11 is equipped with at least a CPU 11a and a debug circuit 11b. The CPU 11a and the debug circuit 11b are connected by an internal bus (address bus, data bus, control bus) 11c. It is noted that the microcomputer 11 may be equipped with ROM, RAM, A/D converter, D/A converter, and peripheral functional circuits such as a variety of timer circuits, in addition to the CPU 11a and the debug circuit 11b.

An interface for debugging according to the Standard Test Access Port Boundary Scan Architecture (generally called as JTAG) is used. It is noted that the interface for debugging may have a structure that uses another interface.

The debug circuit 11b is equipped with a monitor ROM that stores a monitoring program for controlling debugging operations, a functional section that performs data communication with the CPU 11a, a function section that performs data communication with the debugger 20, a break circuit that temporarily stores break conditions for several points and generates a break signal when a specified break condition is detected to stop the execution of a user program, and a trace data extracting function section that extracts data required for real-time tracing in the execution state of the user program and transfers the extracted data to the side of the debugger 20.

A debug circuit 11b supplies a break request signal 11d to a non-maskable interrupt input terminal (a forced interrupt input terminal) of the CPU 11a to thereby stop the execution of the user program, when a break signal is generated by a break circuit provided in the debug circuit 11b, and when a break request is supplied from the side of the debugger 20.

The debugger 20 is formed from a debug tool 21 and a host system 22. The host system 22 is formed by using a personal computer, an engineering workstation or the like. Debugging software is installed in the host system 22. The debug tool 21 and the host system 22 are connected to one another by a host connection cable 23 such as an RS-232C cable or the like, such that data communication between the debug tool 21 and the host system 22 is executed through the host connection cable 23.

The debug tool 21 and the target board 10 are connected to one another by a cable for debugging 24. The debug tool 21 has a function to perform data communication with the debug circuit provided in the microcomputer 11 through the cable for debugging 24, and a function to perform data communication with the host system 22 through the host connection cable 23, and a function to control the debugging operations.

The debug tool 21 sends out a break command to stop the execution of the user program to the debug circuit 11b when a break generation signal 30a is supplied from the break board 30, such that a break request signal 11d is supplied through the debug circuit 11b to the non-maskable interrupt input terminal (forced interrupt input terminal) of the CPU 11a, to thereby stop the execution of the user program.

Specific operations of the debugger 20 and the debug circuit 11b are as follows. When a request for setting break points with respect to the break circuit provided in the debug circuit 11b is supplied from the host system 22, the debug tool 21 sends out a command to set the break points in the break circuit provided in the debug circuit 11b, whereby the break points are set in the break circuit provided in the debug circuit 11b.

When a request for executing a user program is supplied from the host system 22, the debug tool 21 supplies an execution command (e.g. "GO" command) of the user program to the debug circuit 11b such that the user program is executed.

Upon detection of a condition that is set as a break point during the execution of the user program, the debug circuit 11b supplies a break request signal 11d to the CPU 11a to thereby stop (break) the execution of the user program, and notifies to the debug tool 21 that the execution of the user program is broken. The debug tool 21 notifies to the host system 22 that the execution of the user program is broken. When a request to read content at a designated address is supplied from the host system 22, the debug tool 21 supplies the request to the debug circuit 11b to read the content at the designated address, and supplies the content read out to the host system 22.

The debug circuit 11b extracts debug data required for real-time tracing during the execution of the user program, and sends the extracted debug data to the debug tool 21. The debug tool 21 stores the debug data supplied from the debug circuit side in a trace memory section in the debug tool 21 in association with a time sequence, and supplies the debug data stored in the trace memory section to the host system 22.

Break board 30 is equipped with a break condition storage section 31, and a break signal generation section 32. The break condition storage section 31 is composed such that it can be accessed from the side of the CPU 11a through the various buses 15, and break conditions can be written and the written break conditions can be read from the side of the CPU 11a by designating previously set addresses. The break condition 31a stored in the break condition storage section 31 is supplied to the break signal generation section 32.

The break signal generation section 32 monitors the state of the variety of buses 15, and outputs a break generation signal 30a when the state of the variety of buses 15 coincides with a break condition 31a. The break generation signal 30a is supplied to the debug tool 21, and a break request signal 11d is supplied to the CPU 11a through the debug tool 21 and the debug circuit 11b.

It is noted that, when a serial communication is used for data communication between the debug tool 21 and the debug circuit 11b, there may be a time delay in supplying information about the generation of the break generation signal 30a to the debug circuit 11b. Therefore, when a serial communication is used for data communication between the debug tool 21 and the debug circuit 11b, the break generation signal 30a may be directly supplied to the debug circuit 11b in a preferred structure. In this case, when a break generation signal 30a is supplied, the debug circuit 11b supplies a break request signal 11d to the CPU 11a to thereby stop the operation of the user program, and supplies information representing that a break is generated by the break board 30 to the debug tool 21.

Since the debug device 1 of the present invention has the structure described above, break conditions can be pre-set in the break condition storage section 31 in the break board 30, a break generation signal 30a can be generated when the break condition set by the break signal generation section 32 is met, and the execution of a user program can be broken based on the break generation signal 30a.

Figure 2:
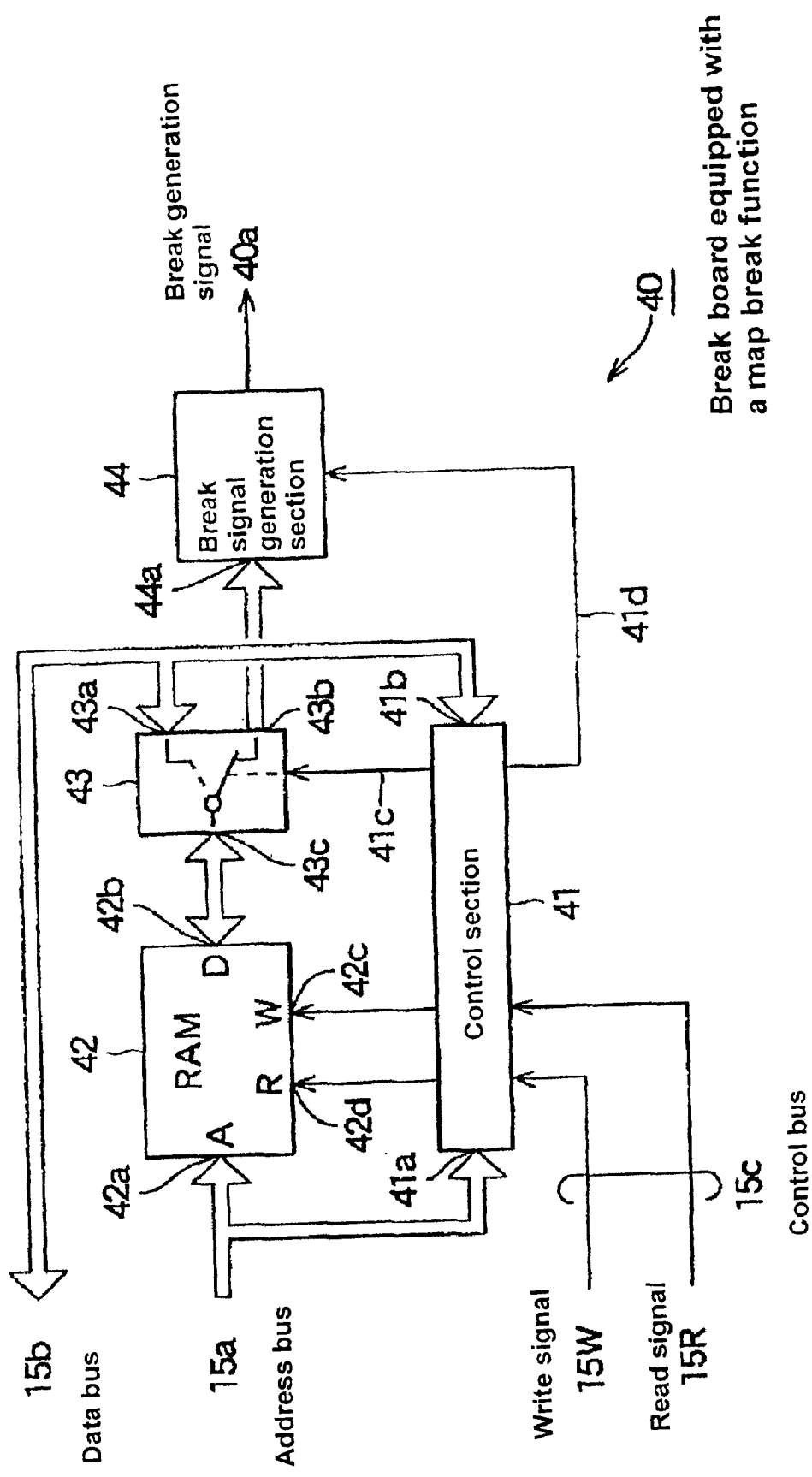
FIG. 2 shows a block diagram of one example of a break board having a map break function.

FIG. 2 shows a block diagram of one concrete example of a break board having a map break function. A break board 40 having a map break function shown in FIG. 2 is formed from a control section 41, a RAM 42 forming a break condition storage section, a data bus switching circuit 43, and a break signal generation section 44. The map break function is to stop (break) the execution of a user program, when a specified address, for example, an inappropriate address is accessed.

An address bus 15a is connected to a group of address input terminals 42a of the RAM 42 and also to a group of address input terminals 41a of the control section 41. A data bus 15b is connected to one group of terminals 43a of the data switching circuit 43 and also to a group of data input/output terminals 41b of the control section 41. Another group of terminals 43b of the data switching circuit 43 is connected to a group of data input terminals 44a of the break signal generation section 44. A group of data input/output terminals 42b of the RAM 42 is connected to a group of common terminals 43c of the data switching circuit 43.

The control section 41 is equipped with an address decode circuit that outputs a signal indicating that, when an address previously set for the control section 41 is supplied, the address is designated, a data latch circuit that latches data supplied on the data bus 15b based on the output signal of the address decode circuit and a write signal, and a control circuit that controls the operation of the break board 40 based on the control data latched at the data latch circuit.

When a request to write control data is issued to the control section 41 from the CPU 11a side shown in FIG. 1 through the various buses 15 (when a request to write control data with previously set addresses being designated is issued to the control section 41), the control data is latched in an internal data latch circuit provided in the control section 41.

When the control data supplied from the CPU 11a side is a request to write a map break condition or a request to read a map break condition, the following operation takes place. The control section 41 outputs a data bus switching control signal 41c at, for example, H level. When the data bus switching control signal 41c at, for example, H level, is supplied, the data switching circuit 43 makes a condition in which the one group of terminals 43a and the group of common terminals 43c are connected to one another (a switched state indicated by a broken line in FIG. 2). As a result, the data bus 15b is connected to the data input/output terminals 42b of the RAM 42. The control section 41 supplies a write signal 15W on the control bus 15c to a write signal input terminal 42c of the RAM 42, and supplies a read signal 15R on the control bus 15c to a read signal input terminal 42d of the RAM 42.

This makes a state in which the RAM 42 on the break board 40 becomes accessible through the various buses 15. In this state, data indicating whether or not an address is set as a break point is written at each of the addresses. For example, data "1" is written in an address where a break point is set, and data "0" is written in an address which is not set as a break point. It is noted that data stored in each of the addresses of the RAM 42 indicating whether or not it is a break point can be confirmed by reading out data stored in the RAM 42.

The debugger 20 writes data indicating whether or not it is a break point in the entire addresses of the RAM 42 on the break board 40 through the debug circuit 11b in the target board 10 and the CPU 11a, and when the above writing operation is completed, writes data requesting to start the map break operation in the control section 41.

The control section 41 outputs a data bus switching control signal 41c at, for example, L level, when the data requesting to start the map break operation is written. When the data bus switching control signal 41c at, for example, L level, is supplied, the data switching circuit 43 makes a condition in which the other group of terminals 43b and the group of common terminals 43c are connected to one another (a switched state indicated by a solid line in FIG. 2). As a result, the data input/output terminals 42b of the RAM 42 are connected to the data input terminals 44a of the break signal generation section 44.

Also, when the data requesting to start the map break operation is written, the control section 41 supplies a logical level signal indicating the read status to the read signal input terminal 42d of the RAM 42, and a logical level signal indicating that it is not a write state to the write signal input terminal 42c. Furthermore, when the data requesting to start the map break operation is written, the control section 41 supplies a break signal generation permission signal 41d that permits an operation of the break signal generation section 44 to the break signal generation section 44, such that the break signal generation section 44 is controlled to be placed in an active state (operation state)

As the user program is executed and various addresses are accessed, data indicating whether or not an address that is accessed is set as the break point is output from the RAM 42, and the data is supplied to the break signal generation section 44 through the data bus switching circuit 43.

The break signal generation section 44 determines whether or not it is a break point based on the data, and outputs a break generation signal 40a when it is the break point. In accordance with the present embodiment, when an address that is set as a break point is accessed, data "1" is output from the RAM 42. As a result, the break signal generation section 44 outputs a break generation signal 40a at, for example, H level, based on the data "1".

By using the break board 40 shown in FIG. 2 with the structure described above, a break point can be set for an address or each of multiple addresses, and break points can be set for one address range or a plurality of address ranges.

It is noted that the control section 41 may be structured to have a function to initialize data in the RAM 42, and data indicating a break point may be written only for an address that is designated as a break point.

In the present embodiment, an example in which data indicating whether or not an address is subject to a map break is stored in each of the addresses in the RAM 42 is shown. However, other structures may also be possible. For example, a plurality of data latch circuits may be provided to latch address that are set as break points, and a plurality of magnitude comparator circuits or the like are provided to detect a difference in the magnitude between an address (an address that is set as a break point) latched on the data latch circuit and an address on the address bus. A break signal may be generated at one address or each of a plurality of addresses based on comparison outputs from the plurality of magnitude comparator circuits or the like, or break generation signals may be generated in one address range or a plurality of address ranges.

Figure 3:
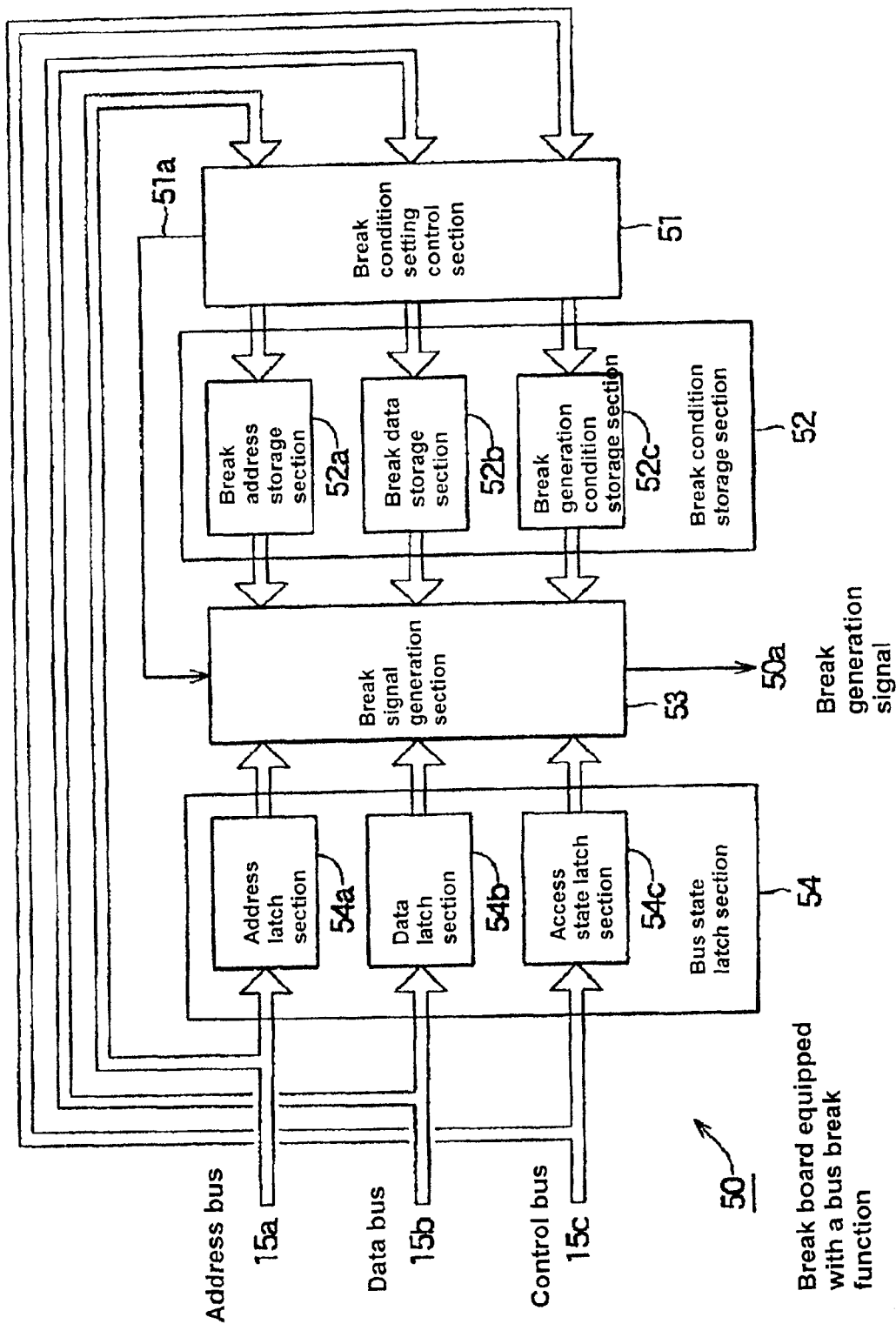
FIG. 3 shows a block diagram of one example of a break board having a bus break function.

FIG. 3 shows a block diagram of one concrete example of a break board equipped with a bus break function. The bus break function is a function to stop (break) the operation of the CPU when specified data is written in a specified address, or when specified data is read out from a specified address.

A break board 50 equipped with a bus break function shown in FIG. 3 is formed from a break condition setting control section 51, a break condition storage section 52, a break signal generation section 53, and a bus state latch section 54. The break condition storage section 52 is equipped with a break address storage section 52a, a break data storage section 52b, and a break generating condition storage section 52c. The bus state latch section 54 is equipped with an address latch section 54a, a data latch section 54b, and an access state latch section 54c.

In the present embodiment, the bus width of the address bus 15a is 32 bits, and the bus width of the data bus 15b is 16 bits. The control bus 15c includes a write signal, a read signal, and an access space designation signal for discriminating between an access (write or read) for the memory address space and an access for an IO (input/output) address space.

Addresses that specify the break condition setting control section 51 are pre-set at the break condition setting control section 51. The break condition setting control section 51 is equipped with an address decode circuit which, when an address that is pre-set for the break condition setting control section 51 is supplied, outputs a signal indicating that the address is designated, and a control circuit that takes in data supplied on the data bus 15b based on an output signal of the address decode circuit and a write signal, and controls the setting of break conditions based on the data taken.

In accordance with the present embodiment, data for setting a bus break condition are supplied from the side of the debugger 20 shown in FIG. 1 through the target board 10 in the following order. First, control data for requesting to set a bus break condition is supplied; in the next bus cycle, data to designate an upper bit of the break address is supplied; in the next bus cycle, data to designate a lower bit of the break address is supplied; in the next bus cycle, break data is supplied; in the next bus cycle, data to designate a break generation condition is supplied; and in the next bus cycle, data to request the start of a bus break operation is supplied.

Here, a variety of break generation conditions as follows can be designated based on the data to designate a break generation condition. (1) A break takes place when designated data is written in a designated memory space address. (2) A break takes place when designated data is read from a designated memory space address. (3) A break takes place either in (1) or (2) above. (4) A break takes place when designated data is written in a designated IO space address. (5) A break takes place when designated data is read from a designated IO space address. (6) A break takes place either in (4) or (5) above.

When the control data for requesting to set a bus break condition is supplied, the break condition setting control section 51 recognizes a break address based on the data to designate an upper bit of the break address supplied in the next bus cycle and the data to designate a lower bit of the break address further supplied in the next bus cycle, and stores the break address in the break address storage section 52a. The break condition setting control section 51 stores break data supplied in the next cycle in the break data storage section 52b. The break condition setting control section 51 stores data to designate a break generation condition supplied in the next bus cycle in the break generating condition storage section 52c. When data to request the start of a bus break operation is supplied in the next cycle, the break condition setting control section 51 outputs a break signal generation permission signal 51a to control such that the break signal generation section 52 is placed in an operating state.

It is noted that, when data to request to stop the bus break operation is supplied, the break condition setting control section 51 stops the output of the break signal generation permission signal 51a, and controls the break signal generation section 53 to be placed in a non-operating state.

The bus state latch section 54 latches a state of each of the buses at each bus cycle. More concretely, address data on the address bus 15a is latched at the address latch section 54a, data on the data bus 15b is latched at the data latch section 54b, and a state (writing in a memory space, reading from a memory space, writing in an IO space, and reading from an IO space) that is specified by signals in the control bus 15c is latched at the access condition latch section 54c.

In a state in which the break signal generation permission signal 51a is supplied, the break signal generation section 53 compares each break condition stored in the break condition storage section 52 and each latch data latched in the bus state latch section 54, and outputs a break generation signal 50a when each of the bus conditions coincides with each of the bus break conditions.

By the break board 50 equipped with a bus break function with the structure described above, a break generation signal 50a can be output when each of the buses 15a, 15b and 15c becomes a specified pre-set state.

It is noted that multiple sets of the circuits shown in FIG. 3 may be provided such that a plurality of bus break points can be set. In this case, a logical sum of break generation signals may be output as a break generation signal.

Figure 4:
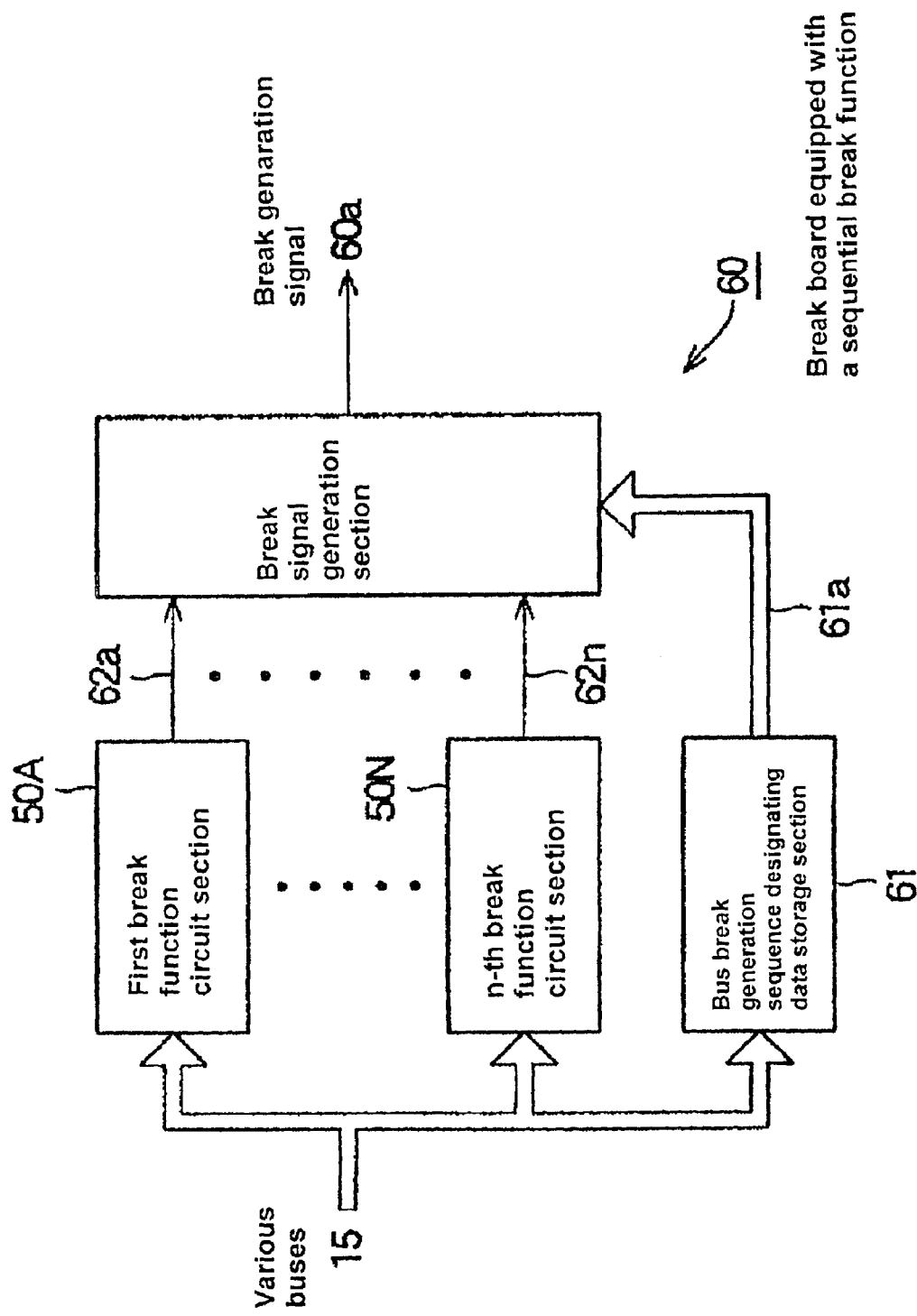
FIG. 4 shows a block diagram of one example of a break board having a sequential break function.

FIG. 4 shows a block diagram of one concrete example of a break board equipped with a sequential break function. The sequential break function is a function in which the execution of a user program is stopped when a plurality of bus break points are passed in a pre-set specified sequence. A break board 60 equipped with a sequential break function shown in FIG. 4 is formed form n sets of bus break function circuit sections 50A–50N, a bus break generation sequence designating data storage section 61 and a break signal generation section 62.

Each of the bus break function circuit sections 50A–50N has a structure that is the same as that of the break board 50 equipped with a bus break function shown in FIG. 3.

Addresses that specify the bus break generation sequence designating data storage section 61 are pre-set at the bus break generation sequence designating data storage section 61. When a write request designating a specified address is supplied through the variety of buses, the bus break generation sequence designating data storage section 61 takes in bus break generation sequence designating data supplied on the data bus and stores the same. The bus break generation sequence designating data 61a stored in the bus break generation sequence designating data storage section 61 is supplied to the break signal generation section 62.

It is noted that bus break generation sequence data is written through the target board 10 from the side of the debugger 20 shown in FIG. 1. Also, each bus break condition is set in each of the bus break function circuit sections 50A–50N through the target board 10 from the side of the debugger 20 shown in FIG. 1.

Here, a first bus break condition is set at the first bus break function circuit section 50A, a second bus break condition is set at the second bus break function circuit section 50B (not shown in the figure), and a third bus break condition is set at an n-th bus break function circuit section 50N. Also, the bus break generation sequence designating data storage section 61 stores conditions that cause to generate a break generation signal 60a with respect to a sequential bus break when bus break points are passed in the order of the first bus break point, the second bus break point and the third bus break point.

The break signal generation section 62 monitors bus break generation signals 62a–62n which are outputs of the respective bus break function circuit sections 50A–50N, and outputs a break generation signal 60a when the generation sequence of the bus break generation signals 62a–62n coincides with the generation sequence that is designated based on the bus break generation sequence designating data 61a.

Here, when the first bus break generation signal 62a indicating the detection of the first bus break point, the second bus break generation signal (not shown in the figure) indicating the detection of the second bus break point, and the third bus break generation signal 62n indicating the detection of the third bus break point are output in this sequence, and when the break signal generation section 62 outputs the third bus break generation signal 62n, the break generation signal 60a is output.

By using the break board 60 with the structure described above shown in FIG. 4, the operation of a user program can be interrupted when specified branch conditions are executed, or the operation of a user program can be interrupted when each of the various kind of input/output devices is accessed in a specified sequence. By this, the execution of a user program can be interrupted only under a complex branch condition or a specified access state, to execute debugging.

It is noted that a break board equipped with all of the functions of the break boards 40, 50 and 60 shown in FIGS. 2–4 may be manufactured in order to cope with each of the functions such as a map break function, a bus break function, and a sequential break function.

As described above, a debug device in accordance with the present invention is structured such that a break board is connected to a target board, and a break signal is generated by the break board. As a result, a debug device using an on-chip debugging function can expand its break function without being limited by the number of break circuits provided on the chip. Accordingly, debugging of user programs can be effectively conducted even with debug devices using the on-chip debugging function.

The entire disclosure of Japanese Patent Application No. 2000-403225 filed Dec. 28, 2000 is incorporated by reference herein.

What is claimed is:

1. A debug device comprising:

a target board having a microcomputer equipped with an on-chip debugging function;

a debugger connected to the microcomputer via a debug interface terminal provided on the target board and that performs debugging using the on-chip debugging function implemented in the microcomputer; and a break board that is separate from the target board, that monitors signals on an address bus, a data bus and a control bus which are output from the target board, and outputs a break signal when a predetermined break condition is satisfied;

wherein the break board is equipped with a storage section to store break conditions, and has a structure in which break conditions are written in the storage section via the target board from the debugger.

2. A debugging device comprising:

a target board;

a microcomputer disposed on said target board, said microcomputer being adapted to perform an on-chip debugging function;

a debug interface terminal disposed on said target board;

a debugger connected to said microcomputer via said debug interface terminal, said debugger being adapted to perform debugging using the on-chip debugging function of said microcomputer; and a break board connected to said target board, said break board being separate from said target board and adapted to monitor signals output from said target board and to output a break signal when a predetermined break condition is satisfied;

wherein said break board includes a storage section storing said predetermined break condition and said predetermined break condition is written to said storage section via said target board from said debugger.

* * * * *